United States Patent Office 3,440,997
Patented Apr. 29, 1969

3,440,997
TEMPERATURE INDICATING DEVICE
Neil E. Rogen, Newton, and Russell J. Hill, Wilmington, Mass., assignors to Avco Corporation, Cincinnati, Ohio, a corporation of Delaware
Filed July 11, 1966, Ser. No. 564,372
Int. Cl. G01k 1/02
U.S. Cl. 116—114.5        12 Claims

ABSTRACT OF THE DISCLOSURE

The invention is directed to a temperature responsive device which use a material that changes its configuration sharply at a transition temperature. The change in configuration is used to actuate a display indicating that the transition temperature has been exceeded.

---

This invention relates to a temperature indicating device and in particular to a device which changes configuration when being raised to a transition temperature.

While the invention is directed generally to a temperature sensing device, by way of example, it is suited for detecting and displaying the fact that the temperature of a frozen food package or the temperature of a container of frozen blood exceeded a predetermined value. The indicator may also be used to monitor temperature surges in furnaces and interiors of sterilization and autoclave equipment.

It is an object of the invention to provide a temperature sensing device which:

(1) Avoids the limitations and disadvantages of such prior art devices;
(2) Undergoes a configuration change when a predetermined temperature is reached or exceeded;
(3) Is actuated over a narrow temperature range;
(4) May be used as an indicator to show that a predetermined temperature has been reached or exceeded.
(5) Uses a material having the capability of being provided with a memorized configuration to which the material returns from a second configuration when a predetermined temperature is exceeded;
(6) Has a memorized configuration above a transition temperature and a formed configuration below this temperature with the additional capability of changing configuration as its temperature is raised to or through the transition temperature;
(7) Includes means for preventing actuation of the device in storage and handling by preventing a configuration change;
(8) Indicates that a predetermined temperature has been exceeded until it is reset;
(9) Provides a visual indication that a predetermined temperature has been reached;
(10) May be made in a simple and facile manner, and may be reused or disposed of as desired.

In accordance with the invention a temperature indicator comprises a first configuration above a transition temperature but formed into a second configuration below the transition temperature. The first material has a capability of changing from the second configuration to the first configuration at the transition temperature. The temperature indicator is also provided with a thin sheet of material positioned with respect to the first material so that its configuration will change when the first material undergoes a change from the second configuration to the first configuration.

The invention also includes a method of making a temperature indicator. The method includes the steps of storing the first configuration in a material characterized by its ability to change from a second configuration to the stored first configuration at a transition temperature. After the first configuration is stored in the material, the material is formed into a second configuration and the second configuration is maintained when the indicator is placed into service.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Nickel, iron and cobalt, when alloyed with titanium exhibit configuration memory capabilities. The preferred alloy is nickel titanium (NiTi) alloy in roughly equal proportions (atomic percent).

It is an alloy capable of (1) being shaped, (2) having the shape memorized, (3) being reshaped below a transition temperature, and (4) reverting to the memorized shape when the temperature of the material is raised to the transition temperature.

The transition temperature is a function of the alloy composition, as will be shown. The change in configuration occurs at or near the transition temperature and it occurs rapidly, within seconds.

In practice as will be seen, the proportions may vary from 47 to 53 atomic percent nickel. When this material is formed into a configuration and raised above 600° C., the configuration becomes "stored" or "memorized."

The configuration change occurs very rapidly over a very narrow temperature range in the vicinity of the nominal transition temperature.

Figure 1:
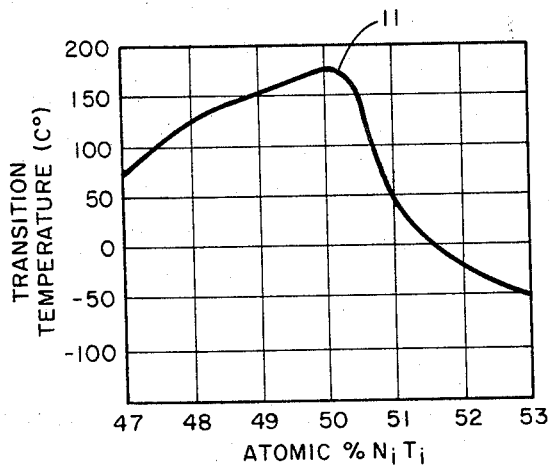
FIGURE 1 is a curve useful in explaining the operation of the temperature indicating device.

Curve 11 in FIGURE 1 is a plot of transition temperature as a function of the NiTi alloy composition. The transition temperature changes as the proportion of the nickel and titanium change. It is quite obvious from curve 11 that transition temperature can be made to vary from 75° through 150° C. and down to −50° C. by a 6 atomic percent change in the proportions of nickel and titanium.

Figure 2:
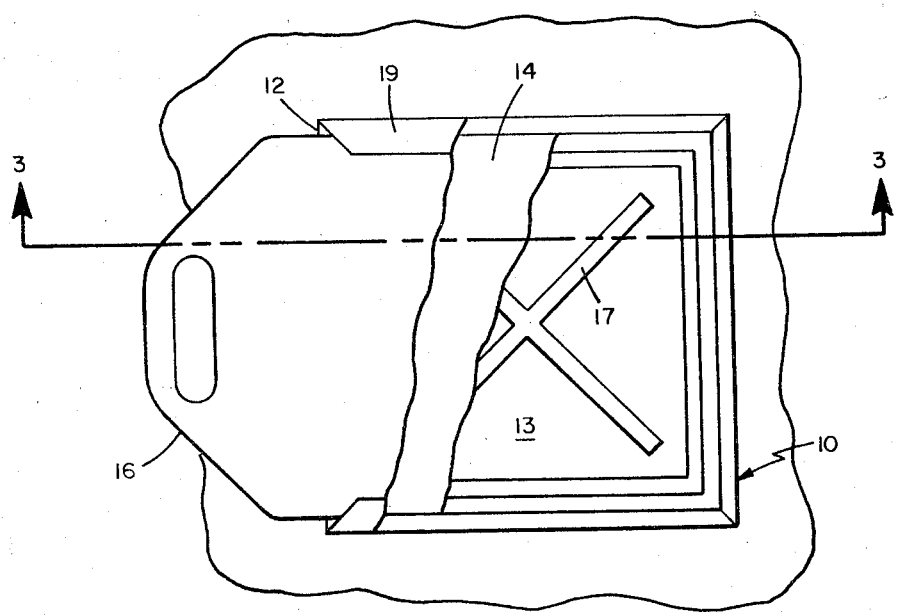
FIGURE 2 is a top view of a temperature indicating device embodying the principles of the present invention. A portion of the top two (2) surfaces has been removed to display the interior.

Referring to FIGURE 2 of the drawings, there is shown a temperature indicator 10 comprising a housing 12 in which is situated a sensing material 13. The sensing material is covered by a foil 14 over which is placed a cover 16. The shape of the housing 12 is not an invention variable. The sensing material 13 is contained within the housing 12 and, in this case conforms generally to the shape of the housing. Through the center of the sensing material 13 of X-shaped cut 17 has been provided.

Figure 3:
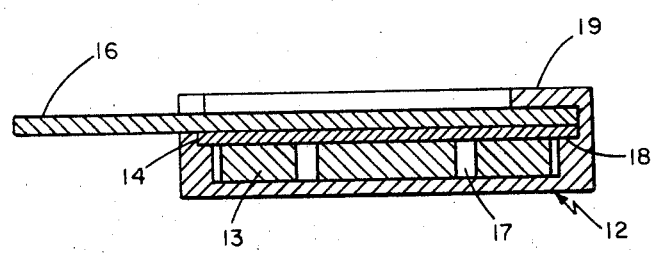
FIGURE 3 is a cross sectional representation taken along the lines 3—3 of FIGURE 2.

Overlying the sensing material 13 is a thin foil 14, the perimeter of which is secured to a lip 18 in the housing 12. A channel 19 is formed about the perimeter of the housing 12 by the inturned edge 21. Inserted in the channel 19 over the foil is the cover 16 as depicted in FIGURES 2 and 3.

The flat configuration shown in FIGURES 2 and represents what shall be referred to hereafter as the formed configuration. So long as the temperature indictor 10 is maintained below the transition temperature it will remain flat. The cover 16 is provided to prevent a configura tion change should the temperature reach the transition temperature during storage and handling.

Figure 4:
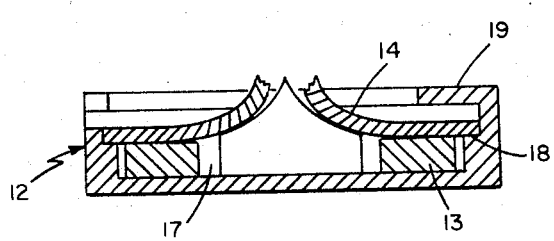
FIGURE 4 is a cross sectional representation of the temperature indicator taken along line 3—3 of FIGURE 2 after it has been activated.

FIGURE 4 is a cross sectional representation of the indicator 10 after it reached or exceeded the transition temperature. It will be noted that the sensing material 13 has changed configuration and in particular the pointed center sections, formed by the groove 17 have been raised through the foil 14 piercing the foil as indicated in FIGURE 4.

By way of summary, a brief description of the complete operation will be described.

Initially, the sensing material 13 is formed into the configuration shown in FIGURE 4. The material is raised above 600° C. so that the FIGURE 4 configuration is stored or memorized.

When the sensing material 13 is cooled it is mechanically formed into the flat (formed) configuration shown in FIGURES 2 and 3 and placed within the housing 12. The formed configuration is a stable one below the transition temperature. The foil is placed over the sensing material and a cover 16 is slid into the channel 19 to prevent any change in configuration, should the temperature of the sensing material 13 exceed the transition temperature.

The transition temperature of course, is a function of the alloy composition and for purposes of this illustration may fall anywhere within 47 to 53 atomic percent. (See curve 11 in FIGURE 1.)

Assume that the NiTi alloy composition is 52 atomic percent nickel. Assume also that the indicator is attached to a package which must be maintained below −25° C. and that if for any reason the package is raised above −25° C., the content is spoiled and thereafter unusable. The indicator 10 is attached to the frozen package and the cover 16 removed. So long as the package is maintained below −25° C., the sensing material will remain in the formed (flat) configuration and the foil remains intact. However, should the temperature of the package for any reason exceed −25° C., the sensing material 13 will undergo a gross configuration change changing from the formed configuration into the stored (memorized) configuration, the latter shown in FIGURE 4. During the transition, the sensing material pierces the foil 14 and provides a positive visual indication that the transition temperature, −25° C., has been exceeded.

In summary, the temperature indicator described functions on the basis of a change in configuration from a formed configuration to a memorized configuration at a predetermined temperature. A preferred design has been disclosed. It is simple and easily manufactured at low cost. It is clear that the disclosed design is merely illustrative; there are countless other configurations and design concepts which can make use of the basic thought of using a configuration change as a temperature indicator.

The various features and advantages of the invention are thought to be clear from the foregoing description. Various other features and advantages not specifically enumerated will undoubtedly occur to those versed in the art, as likewise will many variations and modifications of the preferred embodiment illustrated.

We claim:
1. A temperature indicator comprising:
a first material having a first configuration above a transition temperature and formed into a second configuration below said transition temperature, said first material having a capability of changing sharply from said second configuration to said first configuration at the transition temperature, and
a thin sheet of second material positioned with respect to said first material having its configuration changed by said first material when it undergoes a change from said second configuration to said first configuration.
2. A temperature indicator as described in claim 1 in which said first material is an alloy.
3. A temperature indicator as described in claim 1 in which said first material is a nickel titanium alloy.
4. A temperature indicator as described in claim 3 in which the percent of nickel to titanium lies within the range of 47 to 53 atomic percent nickel.
5. A temperature indicator as described in claim 1 in which the material consists of a metal selected from the group consisting of cobalt, iron, nickel, a mixture and alloy of the foregoing in an alloyed combination with titanium.
6. A temperature indicator as described in claim 1 which includes in addition, means in combination with said first and second materials for preventing a change in configuration when said device is stored at a temperature exceeding the transition temperature.
7. A temperature indicator as described in claim 1 in which said second material is in position to be ruptured by said first material.
8. A temperature indicator comprising a sheet of material having a capability of changing configuration only when raised to a transition temperature, said sheet having a first configuration above the transition tempertaure and a second configuration below said transition temperature and means for preventing a change of configuration.
9. A method of making a temperature indicator comprising:
forming a nickel titanium alloy having an alloy composition in the range of 47 to 53 atomic percent nickel into a first configuration and a predetermined transition temperature,
raising the temperature of said alloy above 600° C. while maintaining said alloy in said first configuration, whereby said first configuration is stored in said alloy,
lowering the temperature of said alloy and shaping it into a second, formed, configuration, and
combining said material with a restraining means and preventing a configuration change.
10. A temperature indicator comprising:
a housing,
a flat sheet of first material placed in the housing, said material having the capability of changing its configuration at a predetermined transition temperature, said sheet further having an X-shaped hole through the thickness thereof, and
a foil of second material overlying said first sheet in a position to have its configuration changed by said second material at the transition temperature.
11. A temperature indicator as described in claim 10 which includes in addition a cover overlying said second material and removably secured to said housing for preventing said first material from changing configuration.
12. A temperature indicator as described in claim 10 in which said foil is positioned to be ruptured by said first material when it changes its configuration.

References Cited

UNITED STATES PATENTS 2,237,705  4/1941  Kohl _____ 73—378.3 X
3,174,851  3/1965  Buehler et al. _____ 75—170

LOUIS R. PRINCE, Primary Examiner.

JOSEPH W. ROSKOS, Assistant Examiner.

U.S. Cl. X.R.

73—378.3; 99—192